(12) United States Patent
Hochhalter et al.

(10) Patent No.: US 10,346,654 B2
(45) Date of Patent: Jul. 9, 2019

(54) RFID-BASED RACK INVENTORY MANAGEMENT SYSTEMS

(71) Applicant: Mox Networks, LLC, Culver City, CA (US)

(72) Inventors: David Hochhalter, Annandale, VA (US); David Bigelow, Upton, MA (US); Nicholas J Witchey, Laguna Hills, CA (US); Chad Milam, Los Angeles, CA (US)

(73) Assignee: Mox Networks, LLC, Culver City, CA (US)

(*) Notice: Subject to any disclaimer, the term of this patent is extended or adjusted under 35 U.S.C. 154(b) by 0 days.

(21) Appl. No.: 15/725,638

(22) Filed: Oct. 5, 2017

(65) Prior Publication Data

US 2018/0096180 A1 Apr. 5, 2018

Related U.S. Application Data

(60) Provisional application No. 62/404,317, filed on Oct. 5, 2016.

(51) Int. Cl.
*G06F 19/00* (2018.01)
*G06K 7/10* (2006.01)
(Continued)

(52) U.S. Cl.
CPC ...... *G06K 7/10366* (2013.01); *H04L 41/0856* (2013.01); *H04L 41/22* (2013.01); *H04L 43/0817* (2013.01)

(58) Field of Classification Search
CPC . G06K 7/10366; H04L 41/0856; H04L 41/22; H04L 43/0817
(Continued)

(56) References Cited

U.S. PATENT DOCUMENTS 8,793,351 B2 7/2014 Renzin
8,837,954 B2 9/2014 Primm et al.
(Continued)

FOREIGN PATENT DOCUMENTS

JP 2006-078318 3/2006
JP 2013-522142 6/2013
(Continued)

OTHER PUBLICATIONS

International Search Report dated Jan. 19, 2018 from corresponding PCT Appl. No. PCT/US2017/055393.
(Continued)

*Primary Examiner* — Karl D Frech
(74) *Attorney, Agent, or Firm* — Mintz Levin Cohn Ferris Glovsky and Popeo, P.C.

(57) ABSTRACT

An asset management system comprises a control function module configured to manage a set of rack-mounted devices having a corresponding allocated rack space when the devices are sparsely distributed over multiple cabinets, possibly in different data centers. The aggregate rack space occupied by the set of devices does not exceed the allocated rack space. A user interface is communicatively coupled to the control function module and configured to generate a virtual representation visible to a user of the set residing in a virtual cabinet corresponding to the allocated rack space. The user interface includes a user control to enable the user to interact with the set of devices. The asset location system can comprise a radio frequency identification (RFID) system to locate and track the devices, and select a subset of the devices to display and control based on filter parameters.

28 Claims, 10 Drawing Sheets

(51) Int. Cl.
*H04L 12/24* (2006.01)
*H04L 12/26* (2006.01)

(58) Field of Classification Search
USPC .............................. 235/385, 383, 381, 375
See application file for complete search history.

(56) References Cited

U.S. PATENT DOCUMENTS

| | | | |
|---|---|---|---|
| 8,917,513 | B1 | 12/2014 | Hazzard |
| 8,929,377 | B2 | 1/2015 | Yang et al. |
| 9,056,754 | B2 * | 6/2015 | Wong .................. G05D 1/0274 |
| 9,066,441 | B2 | 6/2015 | Kilian |
| 9,219,644 | B2 | 12/2015 | Renzin |
| 9,317,336 | B2 | 4/2016 | Alicherry |
| 9,389,903 | B2 | 7/2016 | Zhong |
| 9,705,974 | B2 | 7/2017 | Reddy et al. |
| 2007/0222597 | A1 | 9/2007 | Tourrilhes et al. |
| 2009/0097397 | A1* | 4/2009 | Moreira Sa de Souza .................. H04L 41/0636 370/216 |
| 2009/0108995 | A1 | 4/2009 | Tucker et al. |
| 2009/0115613 | A1 | 5/2009 | Piazza et al. |
| 2011/0215946 | A1 | 9/2011 | Aguren |
| 2011/0227705 | A1 | 9/2011 | Khozyainov |
| 2011/0248823 | A1 | 10/2011 | Silberbauer et al. |
| 2012/0098664 | A1 | 4/2012 | Nordin et al. |
| 2012/0236761 | A1 | 9/2012 | Yang et al. |
| 2012/0303767 | A1 | 11/2012 | Renzin |
| 2013/0031559 | A1 | 1/2013 | Alicherry |
| 2013/0207782 | A1 | 8/2013 | Mather et al. |
| 2014/0075179 | A1 | 3/2014 | Krishnapura et al. |
| 2014/0091138 | A1 | 4/2014 | Nordin et al. |
| 2014/0240100 | A1 | 8/2014 | Johns |
| 2014/0253289 | A1 | 9/2014 | Groth et al. |
| 2014/0304336 | A1 | 10/2014 | Renzin |
| 2015/0113529 | A1 | 4/2015 | Zhong |
| 2015/0234674 | A1 | 8/2015 | Zhong |
| 2016/0011894 | A1 | 1/2016 | Reddy et al. |
| 2016/0011900 | A1 | 1/2016 | Reddy et al. |
| 2016/0013974 | A1 | 1/2016 | Reddy et al. |
| 2016/0013992 | A1 | 1/2016 | Reddy et al. |
| 2016/0014039 | A1 | 1/2016 | Reddy et al. |
| 2016/0014073 | A1 | 1/2016 | Reddy et al. |

FOREIGN PATENT DOCUMENTS

| | | |
|---|---|---|
| KR | 10-0920477 B1 | 10/2009 |
| KR | 10-2015-005670 | 5/2015 |
| WO | WO/2013/015905 | 1/2013 |
| WO | WO/2016/029286 | 3/2016 |

OTHER PUBLICATIONS

Written Opinion dated Jan. 19, 2018 from corresponding PCT Appl. No. PCT/US2017/055393.

* cited by examiner

RFID-BASED RACK INVENTORY MANAGEMENT SYSTEMS

CROSS REFERENCE TO RELATED APPLICATIONS

This application claims the benefit of priority to U.S. provisional application 62/404,317 filed Oct. 5, 2016. This and all other extrinsic references referenced herein are incorporated by reference in their entirety.

FIELD OF THE DISCLOSURE

Subject matter disclosed herein relates generally to asset management in data centers, and more particularly, to apparatus, systems, and methods for use in tracking equipment in data centers.

BACKGROUND

The background description includes information that may be useful in understanding the present invention. It is not an admission that any of the information provided herein is prior art or relevant to the presently claimed invention, or that any publication specifically or implicitly referenced is prior art.

Asset management within distributed network systems can be quite difficult for several reasons. A data center facility might host equipment owned by multiple third parties. For example, in a co-location data center, a customer leases a small portion of space within the data center, usually in a caged-off area or within a cabinet or rack. Typically, this requires separation of equipment owned by different customers, which can result in an inefficient use of space, power, cooling, and other data center resources.

Asset management from the customer's perspective can be difficult when assets are distributed across multiple data centers. For example, risk mitigation strategies include distributing equipment over multiple geographically disperse data centers in order to minimize disruptions due to power loss, natural disasters, and theft.

Virtualization of functionality can be spread among across multiple units so that it can be difficult to identify where virtualized constructs (e.g., virtual machines (VMs), etc.) are physically located. In some instances in which virtualized services and/or resources are leased, it would be desirable to ensure that adequate hardware exists to provide the leased services and/or resources. In some applications, it can be useful to track such hardware resources.

Equipment can be quite expensive, so having redundant devices in a single facility is not always economically practical. Replacement units or spares might be located over large geographic distances (e.g., >100 Km) at other facilities. Thus, it can be useful to better manage and track redundant devices, including replacement units and units in transit.

Accordingly, asset management of devices distributed throughout a data center or across multiple data centers can be improved via the use of virtualization tools that provide for improved situational awareness, monitoring, tracking, and operation of devices. These and other needs in the field are addressed by aspects of the disclosure.

All publications identified herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

In some aspects of the disclosure, the numbers expressing quantities of ingredients, properties such as concentration, reaction conditions, and so forth, used to describe and claim certain embodiments of the inventive subject matter are to be understood as being modified in some instances by the term "about." Accordingly, in some aspects of the disclosure, the numerical parameters set forth in the written description and attached claims are approximations that can vary depending upon the desired properties sought to be obtained by a particular embodiment. In some aspects of the disclosure, the numerical parameters should be construed in light of the number of reported significant digits and by applying ordinary rounding techniques. Notwithstanding that the numerical ranges and parameters setting forth the broad scope of some aspects of the disclosure are approximations, the numerical values set forth in the specific examples are reported as precisely as practicable. The numerical values presented in some aspects of the disclosure may contain certain errors necessarily resulting from the standard deviation found in their respective testing measurements.

Unless the context dictates the contrary, all ranges set forth herein should be interpreted as being inclusive of their endpoints and open-ended ranges should be interpreted to include only commercially practical values. Similarly, all lists of values should be considered as inclusive of intermediate values unless the context indicates the contrary.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g., "such as") provided with respect to certain embodiments herein is intended merely to better illuminate the inventive subject matter and does not pose a limitation on the scope of the inventive subject matter otherwise claimed. No language in the specification should be construed as indicating any non-claimed element essential to the practice of the inventive subject matter.

Groupings of alternative elements or embodiments of the inventive subject matter disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified, thus fulfilling the written description of all Markush groups used in the appended claims.

SUMMARY

In one aspect of the disclosure, systems and methods perform remote sensing to locate radio frequency identification (RFID) devices, and specifically, assets to which the RFID devices are attached. Signal transmissions received from the RFID devices (which can comprise active or passive transmitters) are processed to produce sensor information, which includes location (and possibly other information) for each RFID device. Sensor information received from an RFID system can be used to identify each of a set of rack-mounted instruments distributed across multiple physical racks and produce a list of the rack-mounted instruments. The list is filtered, wherein filtering can be based on the sensor information and at least one additional filter parameter, to produce a filtered list. A virtual rack interface is provided that represents the rack-mounted instruments in the filtered list as residing in a single rack.

The virtual rack interface can comprise a graphical user interface and can enable a user to identify, track, manage, control, and/or operate each rack mounted instrument depicted in the virtual rack. The interface can comprise a graphical user interface that depicts a set of geographically distributed instruments as residing in a single rack. The interface can comprise a user control to operate each of the rack mounted instruments. The user control can configure devices and methods that virtualize the operation of the geographically distributed instruments in a manner that is functionally consistent with how those instruments would operate if they were in the same rack. The virtual rack interface can employ the sensor information to configure devices and methods to provide this virtualized operation.

The sensor information can comprise at least one of geographical location information, network topology, an indication that a particular rack-mounted instrument exists, and an indication that a particular rack-mounted instrument is available for use.

RFID tags comprise at least one of a predetermined relationship with the set of rack-mounted instruments, the predetermined relationship comprising a one-to-one relationship, a many-to-one relationship, and a one-to-many relationship.

In some aspects, the at least one additional filter parameter comprises at least one of a customer identifier, an instrument manufacturer, an instrument type, an instrument model number, an instrument operating status, a serial number, a geographical location, and a network topological location.

In another aspect of the disclosure, an apparatus comprises an RFID system wherein RFID tags are affixed to a set of rack-mounted instruments, and at least one RFID tag reader. The RFID system comprises a filter configured to verify that each of a predetermined set of rack-mounted instruments exists, and to filter the predetermined set of rack-mounted instruments based upon at least one filter parameter for identifying a set of filtered rack-mounted instruments housed in multiple racks. A hardware abstraction layer comprises an interface that represents the set of filtered rack-mounted instruments as a single rack (e.g., cabinet) housing the set of filtered rack-mounted instruments. The hardware abstraction layer can comprise a user interface control for operating the filtered rack-mounted instruments.

In another aspect of the disclosure, an asset management system comprises a memory and a processor. The memory stores sensor information received from RFID tags affixed to multiple rack-mounted instruments distributed across multiple physical racks, and chassis information associated with each of the rack-mounted instruments and comprising a number of rack units per chassis. The processor is operable to filter the set of rack-mounted instruments according to at least one filter parameter, receive sensor information and chassis information for each of the rack-mounted instruments in the filtered list, group the rack-mounted instruments in the filtered list into at least one virtual rack based on the sensor information and the chassis information, and generate a virtual rack interface based on the at least one virtual rack. The virtual rack interface can include a user interface control for operating the rack-mounted instruments in the virtual rack.

In another aspect of the disclosure, a computer system comprises allocable hardware components residing in multiple distributed machines; a communication network communicatively coupling together the hardware components; a controller configured to select a set of the hardware components upon determining availability of each component; and a hardware abstraction layer comprising an interface that represents the set as a single machine. The interface can include a user interface control for operating the hardware components separately and/or collectively. The hardware abstraction layer can be configured to be responsive to the user interface for operating the hardware components. The hardware abstraction layer can operate the hardware components in a manner that appears to the user that the hardware components reside in a single machine. The hardware abstraction layer can be communicatively coupled to the controller and be configurable, such as by the controller, to update the user interface in response to changes in the availability (and/or performance) of the hardware components. The hardware abstraction layer can adapt the operation of hardware components in a manner that is responsive to the changes in their availability (and/or performance).

In one aspect of the disclosure, methods and systems provide for determining availability of each of a set of distributed machines, each machine comprising at least one of a set of allocable hardware components. A set of distributed machines is selected from the set of available distributed machines such that the set of selected distributed machines comprises a sufficient number of allocable hardware components to function as a single computer server. The set of selected distributed machines is communicatively coupled together, and a hardware abstraction layer is provided that includes an interface that represents a set of allocable hardware components in the selected distributed machines as a single device. The interface can comprise a graphical user interface. The interface can comprise controls, such as user controls, configurable to operate the set of selected distributed machines and/or allocable hardware components in the selected distributed machines. The hardware abstraction layer can be responsive to changes in the availability (and/or performance) of the distributed machines (and/or allocable hardware components) to adapt selection and/or operation of the distributed machines and/or allocable hardware components.

Additional features and advantages of the inventive subject matter will be set forth in the description which follows, and in part will be obvious from the description, or may be learned by practice of the inventive subject matter. The features and advantages of the inventive subject matter may be realized and obtained by means of the instruments and combinations particularly pointed out in the appended claims. These and other features of the present invention will become more fully apparent from the following description and appended claims, or may be learned by the practice of the inventive subject matter as set forth herein.

BRIEF DESCRIPTION OF THE DRAWING

Aspects of the disclosure are illustrated by way of example and without limitation in the accompanying figures in which like numeral references refer to like elements, and wherein.

DETAILED DESCRIPTION

Figure 1:
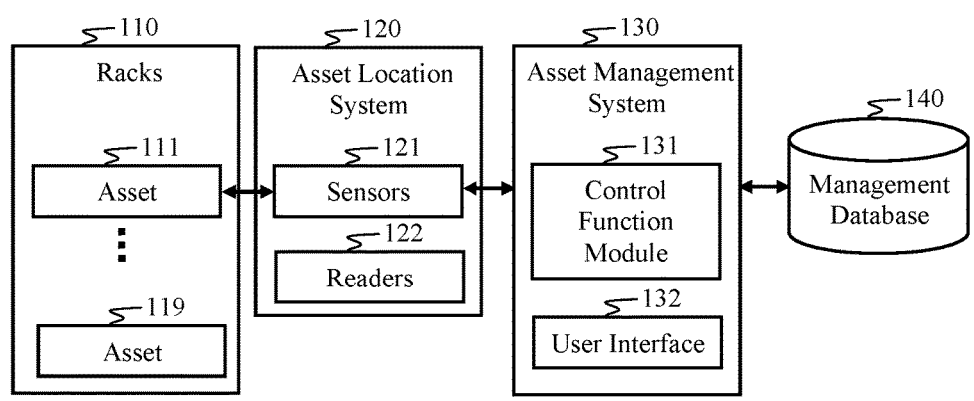
FIG. 1 is a block diagram depicting a system in accordance with some aspects of the inventive subject matter.

Various aspects of the disclosure are described below. It should be apparent that the teachings herein may be embodied in a wide variety of forms and that any specific structure, function, or both being disclosed herein are merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein.

In the following description, for the purposes of explanation, numerous specific details are set forth in order to provide a thorough understanding of the inventive subject matter. It should be understood, however, that the particular aspects shown and described herein are not intended to limit the inventive subject matter to any particular form, but rather, the inventive subject matter is to cover all modifications, equivalents, and alternatives falling within the scope of the inventive subject matter as defined by the claims.

It should be noted that any language directed to a computer should be read to include any suitable combination of computing devices, including servers, interfaces, systems, databases, agents, peers, engines, controllers, modules, or other types of computing devices operating individually or collectively. One should appreciate the computing devices comprise a processor configured to execute software instructions stored on a tangible, non-transitory computer readable storage medium (e.g., hard drive, FPGA, PLA, solid state drive, RAM, flash, ROM, etc.). The software instructions configure or program the computing device to provide the roles, responsibilities, or other functionality as discussed below with respect to the disclosed apparatus. Further, the disclosed technologies can be embodied as a computer program product that includes a non-transitory computer readable medium storing the software instructions that causes a processor to execute the disclosed steps associated with implementations of computer-based algorithms, processes, methods, or other instructions. In some embodiments, the various servers, systems, databases, or interfaces exchange data using standardized protocols or algorithms, possibly based on HTTP, HTTPS, AES, public-private key exchanges, web service APIs, known financial transaction protocols, or other electronic information exchanging methods. Data exchanges among devices can be conducted over a packet-switched network, the Internet, LAN, WAN, VPN, or other type of packet switched network; a circuit switched network; cell switched network; or other type of network.

As used in the description herein and throughout the claims that follow, when a system, engine, server, device, module, or other computing element is described as configured to perform or execute functions on data in a memory, the meaning of "configured to" or "programmed to" is defined as one or more processors or cores of the computing element being programmed by a set of software instructions stored in the memory of the computing element to execute the set of functions on target data or data objects stored in the memory.

One should appreciate that the disclosed techniques provide many advantageous technical effects, including, by way of example and without limitation, improving how users can interact with and otherwise manage physical hardware devices. Steps disclosed in the detailed description add significantly more to virtualization processes than mere computer implementation. For example, by providing an interface to an abstraction layer or a virtual object, this and other aspects of the disclosure go beyond the mere concept of simply retrieving and combining data using a computer. Furthermore, the interface provides a specific use of the abstraction layer or virtual object, which provides management, tracking, control, and other direct ways of operating physical devices distributed throughout a data center and/or across multiple data centers.

One focus of the disclosed aspects is to enable construction or configuration of a computing device to operate on vast quantities of digital data, beyond the capabilities of a human. Although the digital data represents both real and virtual assets, it should be appreciated that the digital data is a representation of one or more digital models of real assets based on sensed RFID information, not the assets. By instantiation of such digital models (e.g., virtual assets, virtual racks, etc.) in the memory of the computing devices, the computing devices are able to manage the digital data or models in a manner that could provide utility to a user of the computing device that the user would lack without such a tool.

The following discussion provides many example aspects of the inventive subject matter. Although each aspect can represent a single combination of inventive elements, the inventive subject matter is considered to include all possible combinations of the disclosed elements. Thus, if one embodiment comprises elements A, B, and C, and a second embodiment comprises elements B and D, then the inventive subject matter is also considered to include other remaining combinations of A, B, C, or D, even if not explicitly disclosed.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

FIG. 1 illustrates a system according to some aspects of the inventive subject matter. The system includes cabinets (i.e., equipment racks) 110 housing assets 111-119, such as rack-mounted equipment, in one or more data centers. Examples of assets 111-119 include computers, servers, switches, routers, power supplies, and storage appliances. The cabinets 110 may include conventional server racks.

For example, a 19-inch rack is a standardized frame or enclosure for mounting multiple equipment modules. Racks are divided into regions that are 1.75 inches (44.45 mm) in height. Such a region is commonly known as a U, for "unit," and heights within racks are measured by this unit. Rack-mountable equipment is usually designed to occupy some integer number of U. For example, an oscilloscope might be 4 U high, and rack-mountable computers are typically between 1 U and 4 U high. A blade server enclosure might require 10 U. An industry-standard rack includes 42 slots. In some instances, a rack may comprise a lesser number of slots, such as 22 slots, or a greater number of slots.

The assets are tracked by an asset location system 120, which can comprise an integrated system of electronic hardware and software that provides identification, location, security, and monitoring of rack equipment in real time to data center personnel.

In one aspect of the inventive subject matter, the asset location system 120 is an RFID-based system that uses RFID tags 121 and readers 122. One or more RFID tags 121 may be affixed to each asset and the RFID reader 122 performs asset detection. In some aspects of the inventive subject matter, one or more of RFID readers 122 may be mounted on the racks 110. In some aspects, one or more readers may be provided for each slot in a rack.

Data (such as location information or data indicating location) from the asset location system 120 is transmitted to a control function module 131 in an asset management system 130. The asset management system 130 interfaces with a management database 140, which stores information received from the asset location system 120. The management database 140 also stores asset management information, such as association information of RFID tags to the assets 111-119, information about the assets 111-119, and ownership of each asset, among other information. Furthermore, the management database 140 may store co-location service information, such as customer lease terms, the number of racks allocated to each customer, customer utilization of their racks, and operating cost per customer. The management database 140 may comprise operating information, such as real-time status of each asset, maintenance schedules, and power usage. The management database 140 may comprise other types of information, including asset information (e.g., serial numbers, warranties, model numbers, etc.), administration information (e.g., management information, system administrator information, phone numbers, rights, permissions, etc.), etc.

Public data centers that lease rack space to tenants under short-term leases are referred to as Co-location Data Centers. In co-location, a customer leases a space within a data center, usually in a caged-off area or within a cabinet, or rack. Tenants leasing from a co-location facility may only lease a few racks or several floors containing hundreds of racks. In a turnkey data-center lease and in a co-location agreement, the data center operator provides the equipment necessary to condition the power and cool the space. The amount of power available to a data center user is more important to both the property owner and the user than the size of the space. Accordingly, rent under data-center leases and collocation agreements is often measured not by the size of the space, but by the amount of power or number of power circuits dedicated to the user.

A user interface 132 linked to the control function module 131 and the management database 140 is used by either or both the data center managers and the customers to view and manage assets. In one aspect of the inventive subject matter, the control function module 131 provides a virtual representation of the assets as part of a process that provides efficient utilization of data center resources. For example, racks that are under-utilized by one customer may be used to house equipment for another customer, thus, making more efficient use of cooling, power, space, maintenance, and other data center resources. The virtual representation may be rendered as a display in the user interface 132 to aid data-center personnel in managing assets, including servers, virtual machines, etc. In some aspects of the inventive subject matter, an RFID asset tag indicates a foundation of real-world value associated with a virtualized resource, such as a virtual machine.

In another aspect of the inventive subject matter, the control function module 131 provides a virtual representation of the assets as part of a risk mitigation process for customers. Instead of occupying an entire physical rack, a customer may choose to distribute their allocated rack space over multiple racks, possibly in different data centers, as part of a risk-mitigation strategy. This can provide for a sparsely distributed rack space that comprises a portion (e.g., one or more rack units) of each of the multiple racks. The remaining portion of each of the multiple racks may be assigned to other customers, for example. Thus, the risk of power loss, theft, or physical dangers (e.g., fire, flood, earthquake, etc.) completely disrupting the customer's operations are reduced. The control function module 131 can be configurable to manage (such as monitor, control, and/or operate) devices in an allocated rack space that is distributed over multiple cabinets. While the devices are located in different racks, the aggregate space occupied by the devices does not exceed the allocated rack space. The virtual representation of the devices in the allocated rack space (e.g., a virtual rack) may be rendered as a display in the user interface 132 to aid data-center customers in managing their assets. In some aspects of the inventive subject matter, the user interface may be used to control the operation of assets by either or both customers and data center personnel.

In accordance with some aspects of the inventive subject matter, a computing device is configured to operate as a virtual rack asset tracking engine. In such aspects, configuring the computing device may comprise storing software instructions in a memory of an asset tracking device and executing an asset tracking module on a processor of the asset tracking device that executes according to the software instructions. The software instructions may be configured to perform at least some of the steps of methods disclosed herein.

In accordance with aspects of the disclosure, instantiation of a virtual representation comprises digital objects within the asset management system. These digital object correspond to digital objects in the computer science sense that can be distinctly managed or manipulated. Thus, a virtual representation of an owner's rack might in reality comprise equipment located in multiple racks, possibly in different data centers, and can have multiple corresponding RFIDs.

Figure 2:
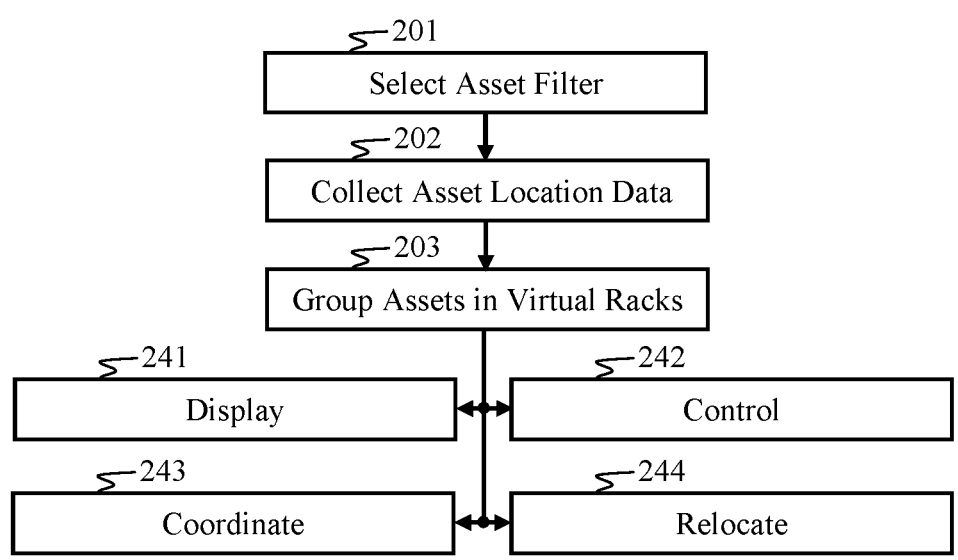
FIG. 2 is a flow diagram depicting a method in accordance with some aspects of the inventive subject matter.

FIG. 2 is a flow diagram depicting methods in accordance with some aspects of the inventive subject matter. Physical assets may be housed in racks in a data center across multiple zones, rooms, floors, and buildings. Furthermore, physical assets may be housed in multiple data centers. In a first step 201, an asset filter is selected and provided to an asset-management system, which directs an asset location system to conduct a search of the assets housed within one or more data centers according to the filter parameters, possibly as a ranked results set. The asset management system collects (and optionally filters) asset location data 202 for physical assets that meet the filter parameters. A list or other suitable data structure indicating the physical assets located in step 202 may be provided to step 203, which groups the assets in virtual racks. In accordance with some aspects of the inventive subject matter, grouping the physical assets in virtual racks facilitates one or more subsequent steps 241-244. In one aspect, the virtual racks are processed for display 241 by a user interface. In another aspect, the virtual racks are input to a control processing step 242, which, by way of example, may enable a user to interact with the assets via user controls in a graphical user interface. In another aspect, the virtual racks are input to a coordination step 243, which is configured to coordinate operations of the assets in a virtual rack. In yet another aspect, the virtual racks are input to a relocation process 244, which may determine more suitable physical locations based on predetermined or dynamically estimated criteria. Aspects of the inventive subject matter may provide for various combinations of the steps 241-244.

In accordance with certain aspects of the inventive subject matter, step 201 provides for selecting one or more filter criteria. For example, an asset filter may comprise a customer ID such that physical assets belonging to a specific customer are located by the asset location system. Accordingly, filter parameters in step 201 may be determined based on predetermined criteria corresponding to one or more steps 241-244 following the step 203. For example, physical assets owned by a particular customer may be selected 201 for a process in the display step 241 that determines a customer's utilization of their leased rack space.

In some aspects, the filter in step 201 may be refined, adapted, expanded, or otherwise changed by processes in any of the steps 241-244, such as via a feedback mechanism. By way of example, a process operating in accordance with one or more of the steps 241-244, upon failing to achieve a predetermined objective with a current group of assets from step 203, may adapt the input parameters (e.g., filter options) in step 201 to produce a new group of assets output by step 203. Other variations and adaptations to the selection criteria in step 201 are also anticipated.

In accordance with other aspects of the inventive subject matter, selection criteria in step 201 may comprise the type of physical asset (e.g., manufacturer, model number, the general function of the asset, its functional capabilities, etc.), the status of the asset (e.g., its current operating mode, its maintenance schedule, load, availability, power usage, health, its use as a primary or a backup, etc.), and/or its location (e.g., geographical location, location relative to a network topology, relative location to other assets, relative delays, etc.).

In step 202, location data for each physical asset may also serve to validate that the asset exists. Furthermore, location data may determine the availability of an asset. For example, location data may indicate whether the asset is potentially functioning (e.g., if the asset is located in a data center) or non-functioning (e.g., the asset is located in storage or is in transit). In some aspects of the inventive subject matter, location data from step 202 may be used to group the assets in step 203. In one example, assets in close proximity may be grouped together. In another example, geographically distributed assets may be grouped for distributed applications. In accordance with various aspects of the disclosure, grouping assets and/or arranging assets within a group can be based on one or more metrics, including physical distance, costs, fees, allocation to virtual constructs (e.g., virtual rack, virtual RAID, etc.), power, latency, etc.

In step 203, filtered assets from step 202 may be grouped in one or more virtual racks. A virtual rack comprises a representation of the physical assets, which may reside in multiple physical racks distributed throughout a data center and/or in racks in different data centers. For example, sparsely distributed devices may occupy less than the total number of rack units available in each of a plurality of racks. Thus, the allocation of a full rack space to a particular customer, entity, application, or other purpose can be partitioned into smaller spaces in multiple racks. The virtual rack facilitates at least one subsequent process, such as represented by steps 241-244. For example, a virtual rack in a display process 241 enables a customer or data center operator to visualize the customer's rack utilization. A virtual rack in a control process 242 may facilitate user interaction with rack-mounted equipment residing in multiple physical racks. Similarly, virtual racks can facilitate user- or machine-initiated coordination and cooperation 243 between physical assets in different racks. In some instances, a virtual rack may be employed in a relocation process 244, such as a recursive algorithm that determines new physical addresses for one or more physical assets in order to optimize one or more criteria.

Figure 3:
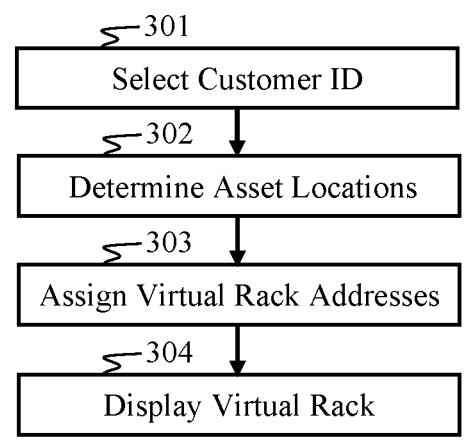
FIG. 3 is a flow diagram depicting another method in accordance with aspects of the inventive subject matter.

In one aspect of the inventive subject matter, a method depicted in FIG. 3 comprises selecting a customer identifier 301 for which a virtual rack comprising rack-mounted equipment owned by the customer will be displayed. An RFID tracking system is employed for determining the location of each piece of equipment (i.e., physical asset) owned by the customer 302. Step 302 may also validate that the equipment corresponding to a particular RFID tag is in one of the data center facilities that leases rack space to the customer.

In step 303, the asset tracking module allocates a virtual rack identifier to each physical asset by binding the virtual rack identifier in a virtual asset object (e.g., a virtual rack comprising a predetermined number of rack units, e.g., an allocated rack space) to a unique equipment identifier (which in some cases may comprise a corresponding RFID tag). While the physical assets may reside in multiple physical racks, and in some cases, the assets may reside in geographically separate facilities, distributed assets belonging to a particular customer identifier are associated with a common virtual rack. Each physical asset comprises a corresponding number of rack units, and since a rack comprises a predetermined number of rack units, physical assets may be grouped into a virtual rack such that the aggregate rack space occupied by a group of physical assets does not exceed the number of rack units in the virtual rack (e.g., allocated rack space).

In accordance with one aspect of the inventive subject matter, step 304 provides for displaying contents of a virtual rack. For example, a graphical user interface (GUI) may be generated to display a representation of each rack-mounted instrument in a virtual rack as though each physical asset resides in the same physical rack. The GUI may contain information about each physical asset, including, but not limited to, device type, model number, hardware specifications, operating mode, operating costs, maintenance status, and operating status.

In some aspects of the inventive subject matter, step 304 may further comprise providing a user control interface to each physical asset. For example, user control may comprise enabling a user to input control parameters or otherwise control the function of the physical asset remotely. The GUI may comprise a reproduction of any output displays residing on the physical asset.

In another set of aspects, the GUI enables the user to move physical assets between different virtual racks. In accordance with some aspects of the inventive subject matter, the GUI comprises user controls for adapting, filtering, or otherwise changing steps 301, 302, 303, and/or 304. In accordance with some aspects of the disclosure, a virtual object can move among physical devices. Such movement can be initiated by the user and/or by some internal or external process. For example, a virtual server might run on RFID_A server blade, and then get moved/migrated to RFID_B server blade in a different facility. Thus, a virtual rack could appear to be stable, such as indicated by the virtual rack's interface, while its underlying real-world physical components change with time.

In accordance with one aspect of the inventive subject matter, a user may select one or more customer identifiers in step 301. In alternative aspects of the inventive subject matter, a filter parameter, including, but not limited to, instrument type, instrument manufacturer, model number, equipment location, operating mode, operating status, or a range of RFID tag numbers, may be used instead of a customer identifier. In other aspects of the inventive subject matter, other parameters (such as the aforementioned parameters) may be used to further filter the physical assets that are grouped into virtual racks. In some aspects, a user control may enable the user to manage rack-space allocations, including updating the allocation for a particular customer, application, use, etc., for example.

In accordance with another aspect of the inventive subject matter, step 303 may comprise filtering the physical assets to produce subsets of the physical assets, followed by allocating each subset to its own virtual rack. For example, assets within each data center facility may be grouped together in a virtual rack such that any operations requiring coordination between assets in the virtual rack avoid inter-facility communication lag. Other subset groupings, such as by equipment type, manufacturer, model number, ID, etc., may be performed in step 303, such as to facilitate interoperability between devices in a virtual rack. In some aspects, virtual rack/equipment IDs could be GUIDs, UUIDs, etc.

Figure 4:
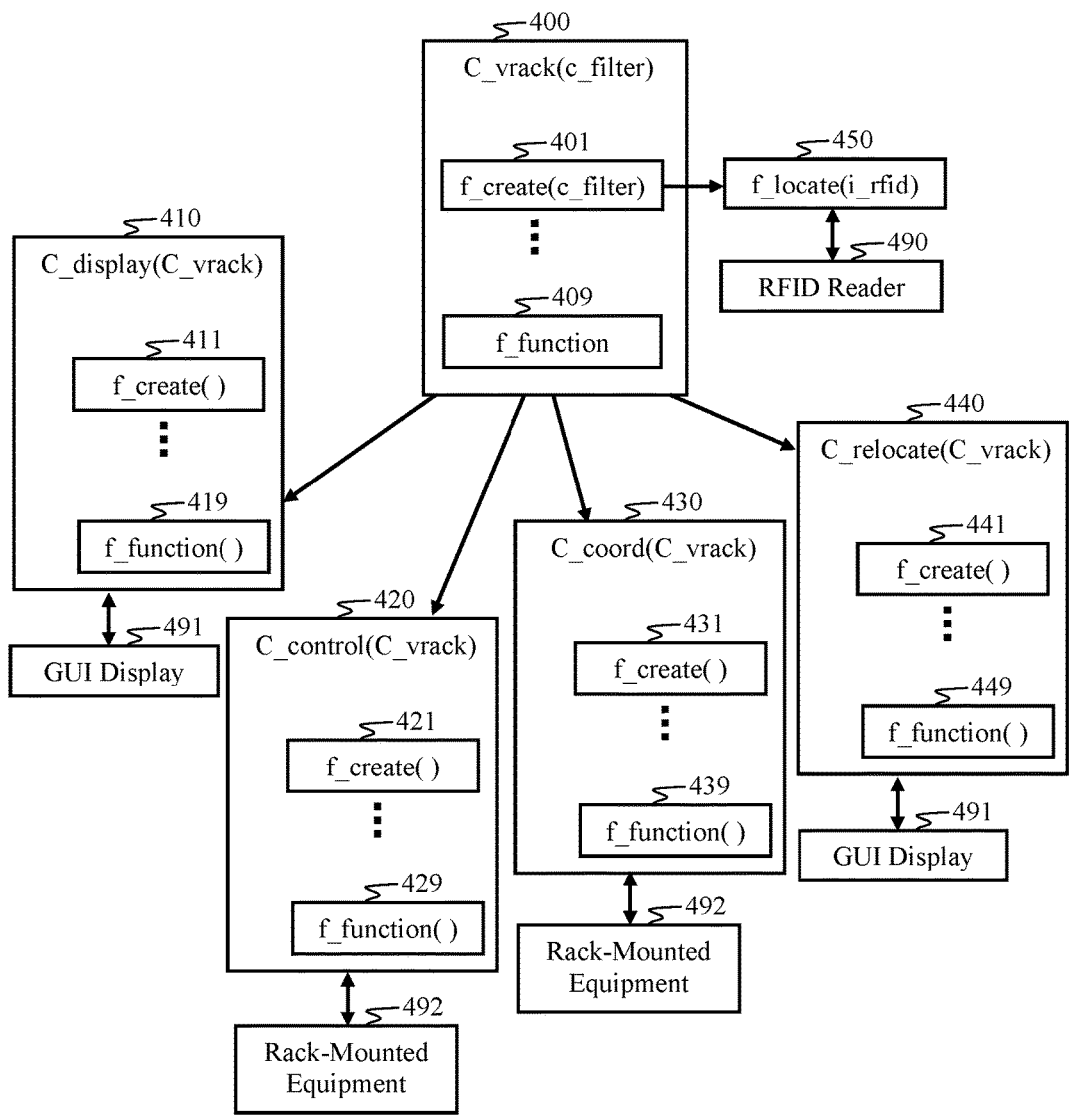
FIG. 4 illustrates methods and associated data structures in accordance with certain aspects of the inventive subject matter.

As illustrated in FIG. 4, software developed in accordance with aspects of the inventive subject matter may comprise functionality that is separable into multiple independent and interchangeable modules. In some aspects, a module may comprise a software object. In some applications, a module may comprise a container that contains other objects. While the scale of a module may vary depending on the programming language and the application, modules are typically designed to perform logically discrete functions and interact via well-defined interfaces. It should be appreciated that although modules could comprise software or data objects, such data objects reside in physical memory of a computing device and can comprise executable instructions store in memory that cause a processor to execute steps that give rise the disclosed functionality as described further below.

In FIG. 4, a virtual rack object (C_vrack) 400 interfaces with at least one of a display module (C_display) 410, a control module (C_control) 420, a coordination module (C_coord) 430, and a relocation module (C_relocate) 440. The virtual rack object 400 comprises methods and data structures that package distributed rack-mounted machines (i.e., physical assets) in a manner that conceals certain details, such as the physical locations of the distributed machines. A graphical representation of the virtual rack 400 may be part of a distributed control environment that provides services, such as access, interaction, and control to all the rack-mounted machines in the virtual rack in a uniform manner. Each virtual rack-mounted machine may enclose network communications within an object-oriented interface.

A module interface expresses the elements that are provided and required by the module. For example, the virtual rack object 400 receives as its input an element labeled c_filter. The elements defined in the interface are usually detectable by other modules. In some aspects of the inventive subject matter, c_filter indicates at least one parameter by which physical assets in a data center are selected for inclusion in the virtual rack object 400. For example, c_filter may indicate a customer identifier by which rack-mounted equipment owned by a customer associated with the customer identifier is selected. In other aspects of the inventive subject matter, combinations of various filter parameters, such as instrument type, manufacturer, model number, asset location, and a range of RFID values, may be used to select physical assets for inclusion in the virtual rack object 400. Elements may comprise various data structures, such as lists, arrays, queues, stacks, and other objects. Each data structure comprises operations that may be performed on it and pre-conditions and constraints on the effects of those operations.

The virtual rack object 400 includes an implementation, which is typically expressed by one or more functions, such as functions 401-409. The implementation contains the working code that corresponds to the elements declared in the interface. For example, the f_create function 401 generates a C_vrack object based on at least one argument (c_filter). The f_create function 401 may call other functions, such as function f_locate 450 which may be internal and/or external to the object 400. For example, according to one aspect of the inventive subject matter, the f_create function 401 fetches a list of RFID values (i_rfid) based on the filter parameter(s), c_filter. The f_locate function 450 interface with an RFID reader device 490, which reads RFID tags affixed to physical assets in at least one data center, and returns at least location information (e.g., physical addresses) of the physical assets associated with the values of i_rfid. In accordance with some aspects of the inventive subject matter, the f_create function 401 may simply employ confirmation that the physical asset exists (and/or is operational) as a condition for including it in a new virtual rack object 400. Once a virtual rack object is created, it may be passed as an argument to another module (e.g., modules 410, 420, 430, and/or 440) that controls hardware.

In accordance with one aspect of the inventive subject matter, the virtual rack object 400, which may include a data type comprising information about the selected physical assets, is passed to the display module 410, which performs one or more functions 411-419 to control I/O hardware, such as a GUI display apparatus 491. In another aspect of the inventive subject matter, the virtual rack object 400 is passed to the control module 420, which comprises one or more functions 421-429 to control the physical assets (i.e., rack-mounted equipment 492). For example, the control module 420 may link the GUI display apparatus 491 with the rack-mounted equipment 492 and establish display and control functions to enable a user to interact with the rack-mounted equipment 492 via the GUI display apparatus 491.

In another aspect of the inventive subject matter, the virtual rack object 400 is passed to the coordination module 430, which may be configured to coordinate the operation of multiple physical assets 492. For example, the coordination module 430 comprises one or more functions 431-439, which may control different pieces of rack-mounted equipment to provide collaborative operations, such as data processing, load distribution, routing, and content delivery. In another aspect of the inventive subject matter, the virtual rack object 400 is passed to the relocation module 440, which comprises one or more functions 441-449 configured to optimize physical locations of the rack-mounted equipment 492, such as to improve operations performed by the coordination module 430. In such aspects, the relocation module 440 may be configured to control the GUI display, such as to indicate new physical locations where one or more physical assets should be moved.

Figure 5:
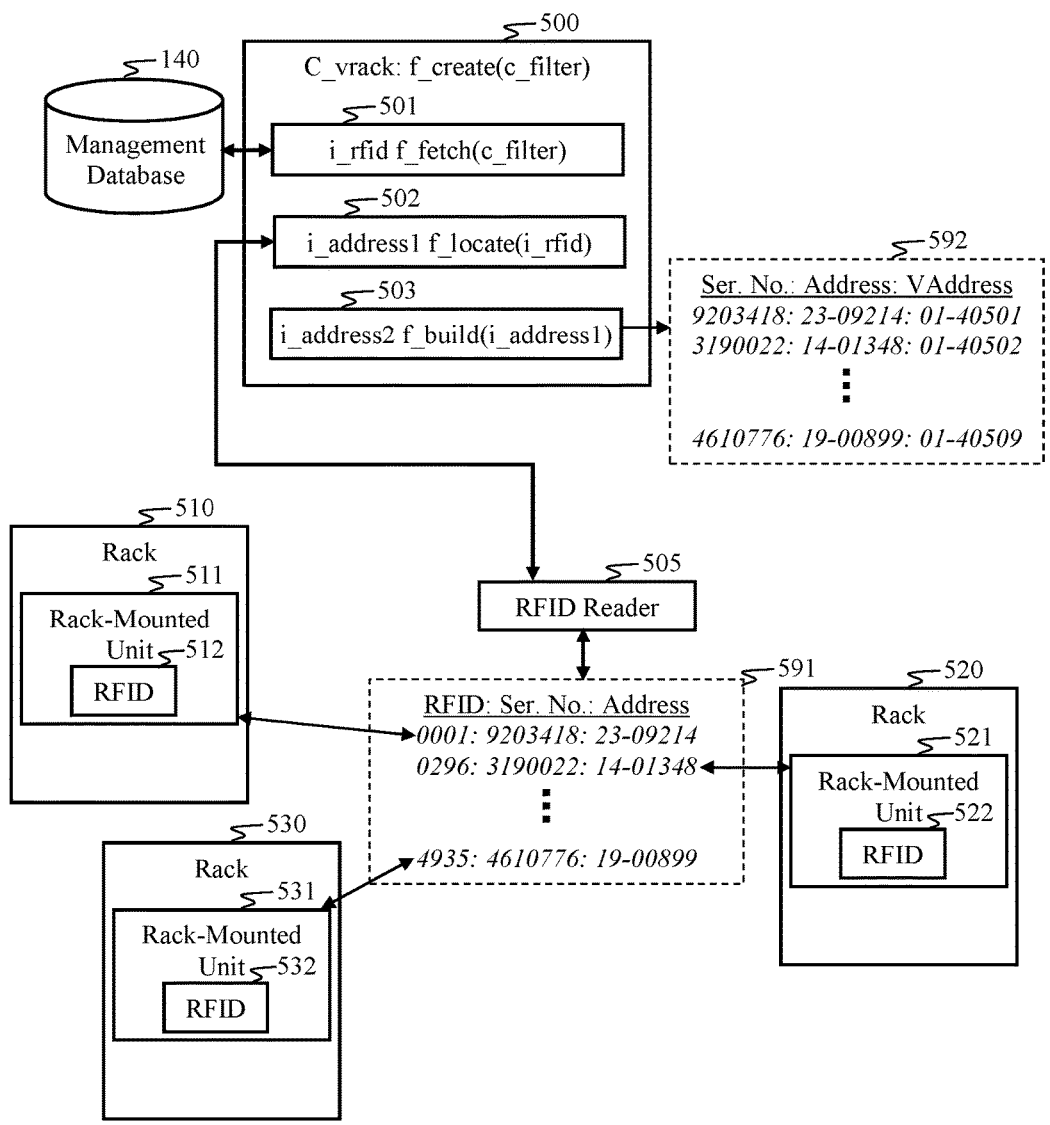
FIG. 5 depicts a method for operating a virtual rack asset tracking engine in accordance with some aspects of the inventive subject matter.

FIG. 5 depicts a method for operating a virtual rack asset tracking engine in accordance with some aspects of the inventive subject matter. The virtual rack asset tracking engine may be implemented as one or more software modules on a processor that executes according to software instructions, such as function 500, which comprises subroutines 501-503.

In accordance with some aspects of the inventive subject matter, the function f_create 500 may be part of an implementation of a virtual rack object (C_vrack). The function f_create 500 generates a virtual rack object based on one or more input filter parameters (c_filter). A first subroutine function, f_fetch 501, employs the c_filter input to search the management database 140 for corresponding RFID values. For example, if the c_filter input comprises a customer ID, then f_fetch 501 searches the management database 140 for RFIDs corresponding to the customer ID. A list of RFIDs (i_rfid) associated with the customer ID, and optionally, information about the physical asset(s) corresponding to each RFID is returned to function 500.

A second subroutine function, f_locate 502, employs the RFID list (i_rfid) as its input for controlling RFID reader hardware 505. The RFID reader 505 searches for specific RFID tags corresponding to the input i_rfid values. For example, the i_rfid list may correspond to RFID tags 512, 522, and 532 affixed to rack-mounted units 511, 521, and 531, respectively. Based on the assumption that each RFID tag is affixed to a physical asset identified in the management database 140, successful detection of an RFID tag corresponds to verification of the corresponding asset's existence, and optionally, its address. In another aspect of the inventive subject matter, the f_locate function 502 filters RFID data received from the RFID reader 505 based on the i_rfid list.

In accordance with some aspects of the inventive subject matter, physical assets corresponding to the i_rfid list are distributed across multiple physical racks (e.g., racks 510, 520, and 530), possibly located in different data centers. The RFID reader may determine the physical location of each RFID tag (512, 522, and 532), and, thus, a physical address of the corresponding physical asset (511, 521, and 531, respectively). By interfacing with the management database 140, the RFID reader 505 and/or the f_locate function 502 may produce a data record set 591 wherein each data record comprises an RFID number, an associated equipment identifier (such as a serial number), and a physical address determined by the RFID reader 505. This data record set 591 may be output by the f_locate function 502 as the data set, i_address1.

Subroutine function, f_build 503, receives data set i_address and generates a second data record set 592, wherein each record in the second set 592 comprises an associated virtual address (VAddress). The manner in which virtual addresses are determined may depend on additional input parameters, such as filter parameters (not shown). Thus, the f_create function 500 maps physical equipment distributed across multiple physical racks to virtual equipment in a virtual rack.

When the virtual rack object is passed to an asset management module or function (not shown), the asset management maps the virtual equipment in the virtual rack to the physical equipment distributed across multiple physical racks. The virtual rack object may comprise identifiers whereby each piece of physical equipment has a physical address corresponding to the physical address of the physical rack in which it is located, and may further include its location (e.g., slot) within the rack. This physical address may be identified via one or more RFID tags. Each piece of equipment also has a virtual address which associates it with other equipment in a virtual rack. In some aspects of the inventive subject matter, this association may be made with respect to ownership of the physical equipment. Thus, each piece of equipment belonging to a particular data center customer may share the same virtual rack address. A display will represent each piece of equipment as residing in the virtual rack even though the physical addresses of the equipment span multiple physical racks. For example, in a display of a virtual rack representation, a customer's assets appear as one or more racks containing only the customer's assets. Similarly, other filter parameters may be used to group assets, such as type of equipment, manufacturer, model number, etc. Asset translation software (i.e., the asset management system) translates the virtual addresses into physical addresses for certain operations, such as to control and coordinate operation of the physical assets.

Figure 6:
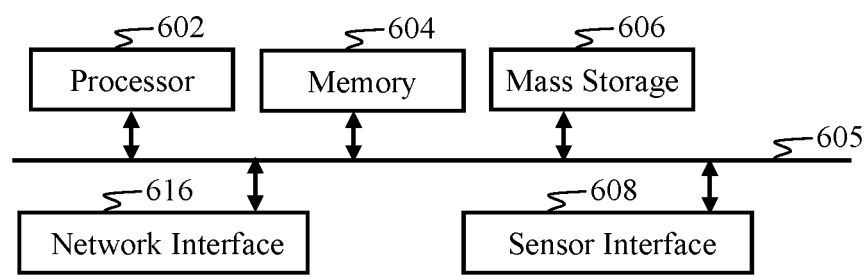
FIG. 6 illustrates an exemplary block diagram of a computer system that may be employed in aspects of the inventive subject matter.

FIG. 6 illustrates an exemplary block diagram of a computer system that includes one or more processors, such as processor 602, providing an execution platform for executing software, for example, including at least some of the steps illustrated in the methods and other steps described herein. The processor 602 may also execute an operating system (not shown) for executing the software in addition to performing operating system tasks. The computer system also includes a main memory 604, such as a Random Access Memory (RAM), where software may be resident during runtime, and mass storage 606. The mass storage 606 may include one or more hard drives and/or a removable storage drive, such as a floppy diskette drive, a magnetic tape drive, a compact disk drive, or a flash nonvolatile memory where a copy of software or data may be stored. Applications and resources may be stored in the mass storage 606 and transferred to the main memory 604 during run time. The mass storage 606 may also include ROM (read only memory), EPROM (erasable, programmable ROM), EEPROM (electrically erasable, programmable ROM). A bus 605 is shown for communicating data via components of the computer system.

A network interface 616 may be provided for communicating with the assets and other devices via a network. Also, sensor interfaces 608 are provided for connecting to the asset location system 120 shown in FIG. 1. The computer system depicted in FIG. 6 is a simplified example of a platform. It will be apparent to one of ordinary skill in the art that the other components may be added or components may be removed as needed. For example, one or more interfaces may be provided for connecting one or more I/O devices.

One or more of the steps of the methods described herein and software described herein may be implemented as software embedded or stored on a computer readable medium, such as the main memory 604 or the mass storage 606, and executed by the processor 602. The steps may be embodied by a computer program, which may exist in a variety of forms both active and inactive. For example, there may exist as software program(s) comprised of program instructions in source code, object code, executable code or other formats for performing some of the steps when executed. Any of the above may be stored on a computer readable medium, which include storage devices and signals, in compressed or uncompressed form. Examples of suitable computer readable storage devices include conventional computer system RAM (random access memory), ROM (read only memory), EPROM (erasable, programmable ROM), EEPROM (electrically erasable, programmable ROM), and magnetic or optical disks or tapes. Examples of computer readable signals, whether modulated using a carrier or not, are signals that a computer system hosting or running the computer program may be configured to access, including signals downloaded through the Internet or other networks. Concrete examples of the foregoing include distribution of the programs on a CD ROM or via Internet download. In a sense, the Internet itself, as an abstract entity, is a computer readable medium. The same is true of computer networks in general. It is therefore to be understood that those functions enumerated herein may be performed by any electronic device capable of executing the above-described functions.

In the same manner in which one may interpret an object in object-oriented programming as an abstraction of data and functions, some aspects of the inventive subject matter provide for a common interface for different combinations of distributed hardware components, which may be implemented in different ways, but overall, achieve the same function.

Figure 7:
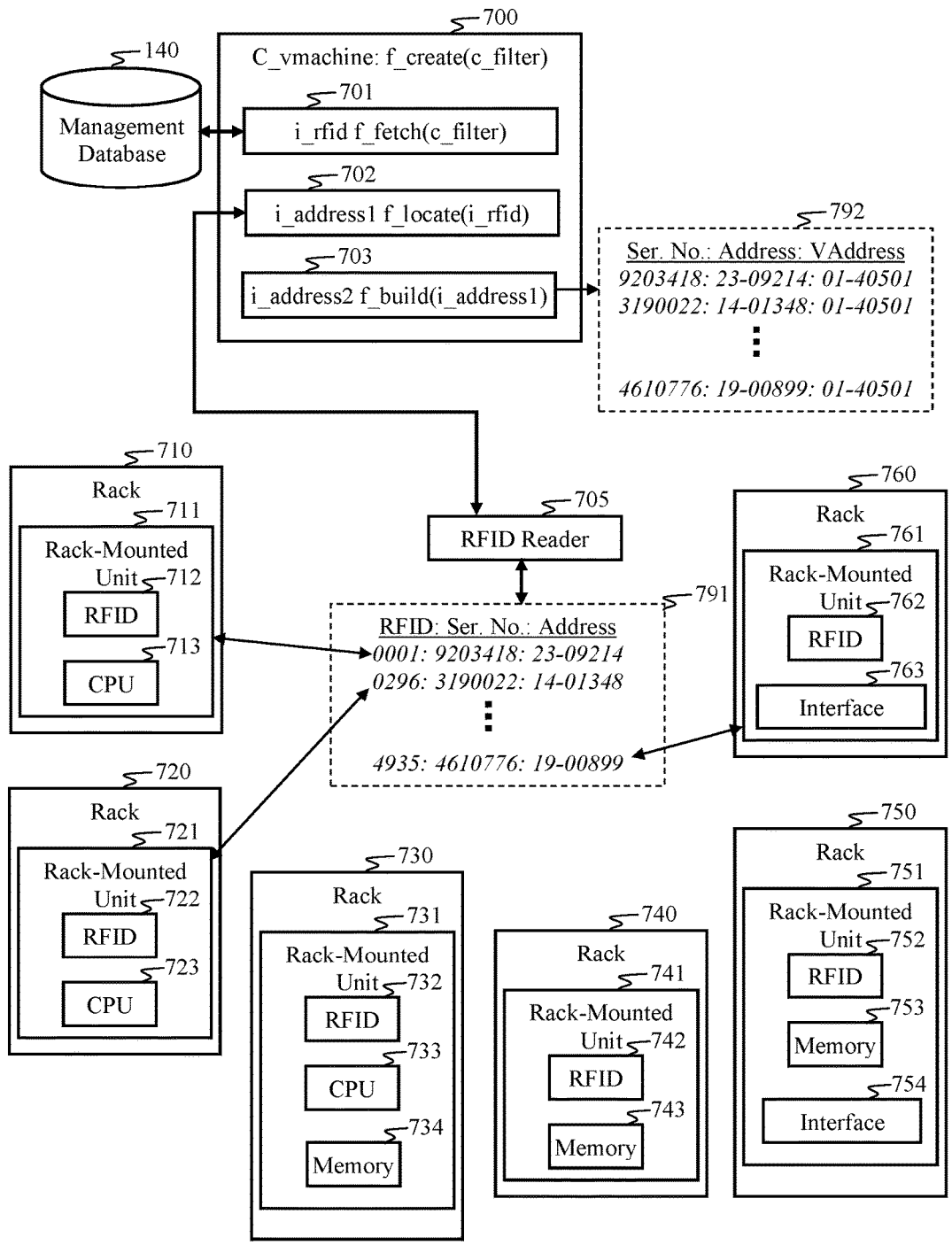
FIG. 7 illustrates methods according to some aspects of the inventive subject matter.

In accordance with some aspects of the inventive subject matter, as depicted in the block diagram in FIG. 7, an object-oriented model may be employed as an interface between hardware components in a distributed computing system. For example, rack-mounted equipment units 711, 721, 731, 741, 751, and 761 may each reside in a separate rack (such as racks 710, 720, 730, 740, 750, and 760, respectively), and those racks 710, 720, 730, 740, 750, and 760 may reside in different zones, rooms, floors, buildings, and or different data centers. At least one hardware component in each rack-mounted unit 711, 721, 731, 741, 751, and 761 (such as a CPU, a memory, a network interface, etc.) may be allocated to be part of a virtual machine. In this aspect, a virtual machine comprises a set of hardware components residing in different machines (e.g., the rack-mounted units) configured to function together as a single machine. An abstraction of this implementation provides a virtual representation that depicts a single machine, such as from the perspective of a user or a software program.

Abstraction captures only those details about an object that are relevant to the current perspective. For example, a virtual server may comprise a representation of a single machine that is actually a set of machine components (e.g., processors, memory, peripheral devices, network interfaces, etc.) distributed across multiple machines that are communicatively coupled together via a network. Irrespective of where the server's components reside, the machine operates in the same manner from the user's perspective.

There may be latency or other artifacts relating to communicatively coupling the various components over a network instead of via connections on a chip, a card, or between components inside a single machine, and such artifacts may be conveyed to the user or software application as properties of the virtual machine without conveying how such properties arise.

In accordance with some aspects of the inventive subject matter, a virtual hardware system can have several abstraction layers whereby different meanings and amounts of detail are exposed to the user. For example, hardware components distributed across multiple machines connected via a long-haul network may exhibit noticeably more latency in certain operations than would occur if performed by a single machine. In such instances, this latency (and/or the effects of such latency) may be conveyed to the user or the software application employing the virtual hardware system.

It is anticipated that in some aspects of the inventive subject matter, the virtual machine may be adaptable in the sense that different machine components may be dynamically selectable in response to operating requirements of a software application, for example. In such aspects, components in close proximity to each other may be selected during or just prior to performing operations that are sensitive to latency. Similarly, processing and memory components may be dynamically allocated during the operation of a software application to automatically scale according to the processing and storage needs of the application, and such resources may be released when no longer required.

In accordance with some aspects of the inventive subject matter, control abstraction provides abstraction of actions performed by the system of distributed hardware. For example, delivery of a media file in response to a user request may be represented to a network operator as a simple client-server operation. However, in a distributed server system, the simple client-server operation may be an abstraction of a complex process whereby a media file in encoded using cooperative subspace coding via multiple network nodes, and the client retrieves coded file segments from the nodes by selecting additional serving nodes until it achieves sufficient rank to decode the file. In another example, control abstraction may hide implementation details of a distributed computing environment, such as the coordination of distributed processing and memory resources.

Hardware abstraction enforces a clear separation between the abstract properties of a machine type and the concrete details of its implementation. The abstract properties are those that are visible to the user or the software that makes use of the machine type while the concrete implementation is kept entirely private, and indeed can change, for example, to incorporate efficiency improvements and/or dynamically adapt to programming and/or network conditions.

In one aspect of the inventive subject matter, an object model of a virtual hardware machine comprises the facility to define machine components as abstract "actors" that perform predetermined functions, change their state, and communicate with other components in the system. Encapsulation hides state details of each machine component while standardizing the way that different component types that perform the same function interact with the system. Some aspects of the inventive subject matter may provide for polymorphism by enabling hardware components of different types that perform the same function to be substituted with each other. In some aspects of the inventive subject matter, a representation of a hardware component may inherit its behavior from another object (e.g., a parent object) while implementation details of its functions (including implementation details for interacting with different machine architectures) is hidden from the user or software application.

In accordance with one aspect of the inventive subject matter, a virtual machine object (C_vmachine) created by a function, f_create 700, comprises data structures and functions that provide an abstraction to a user and/or software application. For example, a virtual machine object may be created based on predetermined and/or dynamic parameters, such as c_filter. A function, f_fetch 701, employs the c_filter parameters and interfaces with the management database to determine RFIDs of rack-mounted units whose components will comprise the virtual machine. For example, certain machines and/or specific components within specified physical assets may be allocable to a particular customer, a specific application, or otherwise allocable based on a combination of various input parameters (c_filter) and/or operating conditions.

A location function, f_locate 702, interfaces with RFID reader hardware 705, which detects the presence of and locates rack-mounted units 711, 721, 731, 741, 751, and 761 based on the RFID arguments, i_rfid. Specifically, the RFID reader hardware detects at least one RFID tag (such as tags 712, 722, 732, 742, 752, and 762) associated with each of the rack-mounted unit 711, 721, 731, 741, 751, and 761. In one aspect of the inventive subject matter, the function 702 may determine that each of the allocable components exist, and then determine the geographical and/or network topological location of each component. Upon determining locations of the rack-mounted units 711, 721, 731, 741, 751, and 761 containing the allocable components, a subset of the components may be selected as appropriate for an anticipated application and/or in response to specified filter parameters, c_filter.

In the aspect depicted in FIG. 7, a set of allocable processors 713, 723, and 733 are available in the rack-mounted units 711, 721, and 731. One or more of the processors 713, 723, and 733 may be selected for the virtual machine, such as may be appropriate with respect to other allocable resources, such as memory, network interfaces, peripheral components, etc. For example, the processor 732 in rack-mounted unit 731 may be selected for low-latency operations, since memory 734 also resides in unit 731. One or more of the units 731, 741, and 751 may be selected for its available memory components 734, 743, and 753 respectively. One or more of the units 751 and 761 may be selected for its available network interfaces 754 and 763, respectively.

Data pertaining to each allocable component may be expressed by a data structure 791, which comprises an RFID indicator, serial number, and associated physical address corresponding to its rack-mounted unit. Additional data (not shown) may comprise the component type, the component's capabilities, and/or the physical location of the component inside its rack-mounted unit. In some instances, a component may be shared among multiple users, software applications, processes, etc., and an available portion of the component (e.g., processing cycles, memory size, interface bandwidth, etc.) may be specified in the data structure 791.

Data retrieved by the f_fetch function 702 is input to an f_build function 703, which builds the virtual machine from the allocable components. In some aspects of the inventive subject matter, f_build 703 may dynamically select the allocable components, such as based on a user's needs and/or operating requirements of software applications running on the virtual machine. In accordance with some aspects, the allocable components may be selected based on real-time and/or statistically determined network conditions of networks that communicatively couple together the rack-mounted units 711, 721, 731, 741, 751, and 761. The virtual machine may comprise data structure 792, which indicates the serial number and physical address of each rack-mounted unit 711, 721, 731, 741, 751, and 761, and information (not shown) pertaining to the allocable component(s) inside each rack-mounted unit 711, 721, 731, 741, 751, and 761.

In one aspect of the inventive subject matter, the virtual machine object, C_vmachine, provides for hardware virtualization of a system comprising distributed physical components. For example, C_vmachine hides the physical characteristics of a distributed computing platform from users and software applications, instead, providing a common interface that resembles a single computer. While the physical components (e.g., CPUs, memory, network interfaces, peripheral devices, and other components) may reside in multiple rack-mounted units residing in multiple racks, and possible distributed over multiple geographical locations, the virtual machine appears to be a single piece of hardware, such as a single rack-mounted unit. While the physical components may reside in machines having different computer architectures, C_vmachine may hide all of the translation hardware and software necessary to ensure interoperability between the components. Similarly, any communication hardware and software that communicatively couples the components is also hidden. Thus, aspects of the C_vmachine may comprise a control program (e.g., a hypervisor program) to control virtualization, ensure physical connectivity between the components, continuously monitor and reallocate resources (e.g., components) as necessary, and ensure interoperability between components on different types of platforms.

Figure 8:
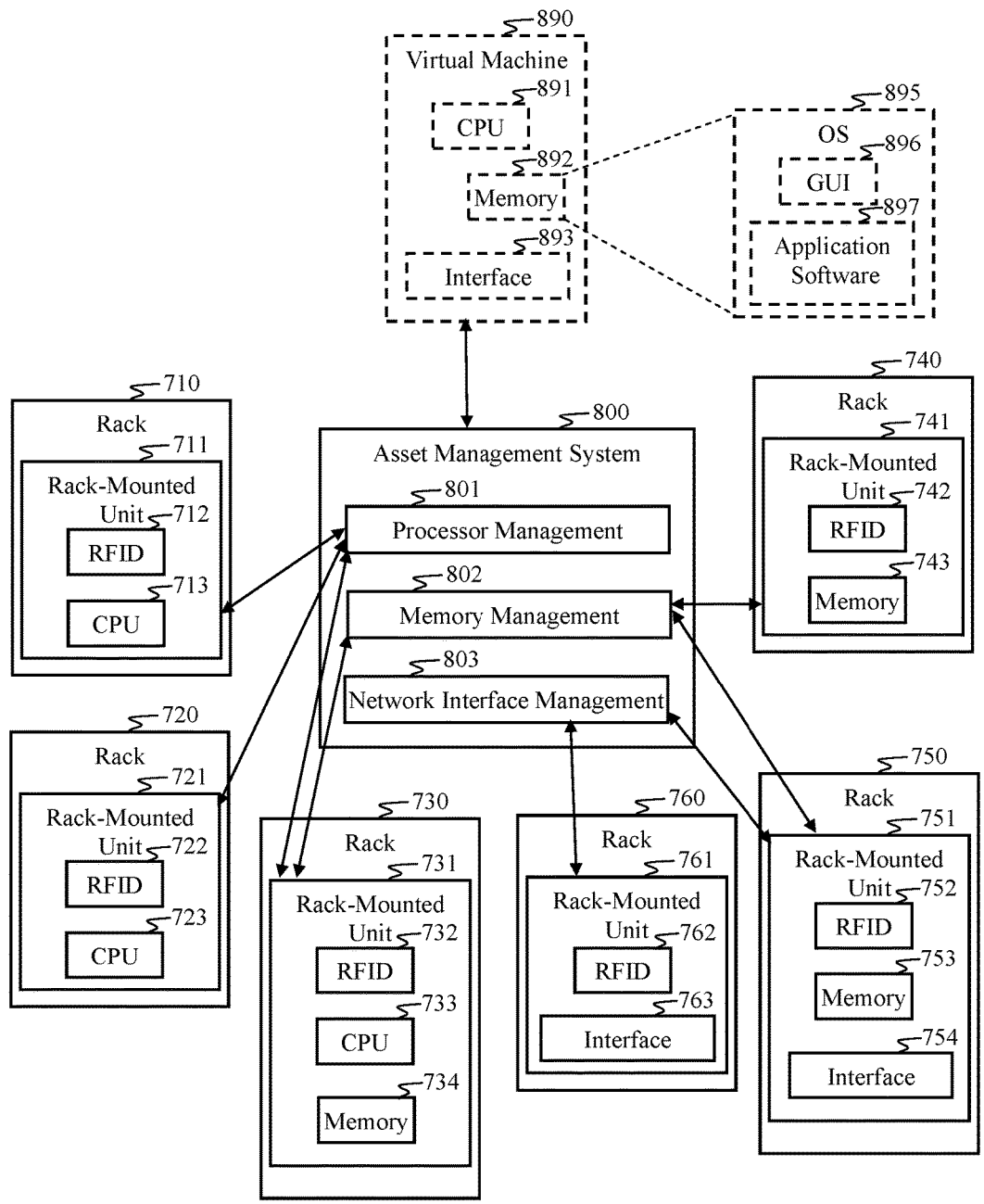
FIG. 8 illustrates methods according to other aspects of the inventive subject matter.

FIG. 8 is a block diagram of an asset management system 800 that interacts with rack-mounted units 711, 721, 731, 741, 751, and 761 to provide a virtual machine 890 abstraction. The asset management system 800 comprises a processor management module 801, a memory management module 802, and a network interface management module 803. The processor management module 801 coordinates distributed processing by processors 713, 723, and 733. The memory management module 802 coordinates data storage across multiple memory resources 734, 743, and 753. The network interface management module 803 coordinates the control and implementation of network interfaces 754 and 763.

The virtual machine 890 comprises a processor abstraction represented by CPU 891, a memory abstraction represented by memory 892, and a network interface abstraction represented by network interface 893. The virtual machine may provide for platform virtualization in which host software creates a simulated computer environment, such as operating system abstraction 895. In some aspects of the inventive subject matter, the operating system abstraction 895 may provide a GUI 896. In some aspects of the inventive subject matter, the operating system abstraction 895 may provide an environment for running application software 897.

Figure 9:
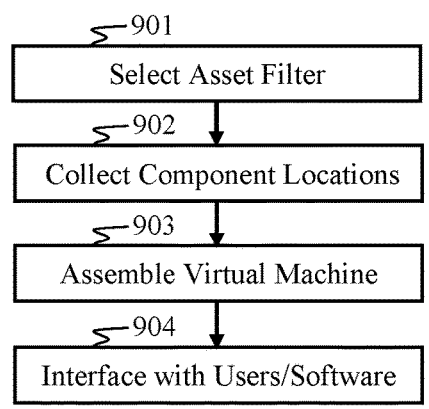
FIG. 9 is a flow diagram depicting a method in accordance with some aspects of the inventive subject matter.

FIG. 9 is a flow diagram depicting methods in accordance with some aspects of the inventive subject matter. In a first step 901, an asset filter is selected and provided to an asset-management system, which directs an asset location system to conduct a search for a set of physical assets corresponding to one or more filter parameters. In some aspects of the inventive subject matter, the assets comprise rack-mounted equipment residing in at least one data center. In accordance with one aspect, the filter indicates which physical assets have at least one predetermined hardware component allocable as a subset of a plurality of allocable components in a virtual machine, and step 901 is part of a method configured for assembling the virtual machine from hardware components selected from the physical assets that meet the filter parameters.

In accordance with one aspect of the inventive subject matter, the location of each physical asset that meets criteria set forth by the asset filter in step 901 is collected in step 902 from the asset location system. A list or an alternative data structure indicating the set of physical assets and their respective locations may be generated in step 902. The asset locations may be used to further filter the list (or alternative data structure), such as to reduce latency and/or achieve other operational objectives of the virtual machine. In some aspects of the inventive subject matter, the location data may comprise the location of at least one allocable component in the physical asset.

The list (or alternative data structure) is provided to step 903, which communicatively couples together the allocable components located in different physical assets to assemble the virtual machine. Step 903 may comprise steps for routing communications between the components, providing control functions to coordinate the operation of the components, and enabling interoperability between different platforms and communication protocols. Step 903 may comprise resource management of one or more components, such as when a component is shared by multiple users and/or software applications.

In step 904, a virtual machine abstraction is provided by an interface that hides at least some of the functions performed in step 903. For example, the interface may conceal the distributed nature of the machine's operation by rendering an operating system or computing platform by which a user or software application interacts. In accordance with certain aspects of the inventive subject matter, step 904 may direct control back to step 901. For example, in response to user inputs and/or operation of software applications, step 904 may select new filters or otherwise adapt the filter criteria in step 901 in order to assemble a new virtual machine or otherwise adapt the hardware configuration of the current virtual machine.

In some aspects of the inventive subject matter, step 901 provides for selecting one or more filter criteria. For example, an asset filter may comprise a customer ID such that assets allocated to a specific customer are located by the asset location system. In another aspect, components may be selected to minimize latency. In another aspect, components may be selected to achieve network load balancing. In yet another aspect, network interface and storage components may be selected for a media distribution application in which popular content and transcoding capabilities are distributed at the edges of a content delivery network.

In some aspects, the filter in step 901 may be refined, adapted, expanded, or otherwise changed by processes in any of the steps 902-904, such as via a feedback mechanism (not shown). In accordance with aspects of the inventive subject matter, selection criteria in step 901 may comprise the type of asset (e.g., manufacturer, model number, the general function of the asset, its functional capabilities, etc.), the status of the asset (e.g., its current operating mode, its maintenance schedule, load, availability, power usage, health, its use as a primary or a backup, etc.), and/or its location (e.g., geographical location, location relative to a network topology, relative location to other assets, relative delays, etc.).

In step 902, location data for each asset may also serve to validate that the asset exists. For example, a customer who leases a virtual machine may simply validate that the resources corresponding to the customer's subscription level exist and are available for use. The location data may help a customer determine the availability of virtual machine resources. For example, location data may indicate whether a physical asset is potentially functioning (e.g., if the asset is located in a data center) or non-functioning (e.g., the asset is located in storage or is in transit). In some aspects of the inventive subject matter, location data from step 902 may be used to group the assets in step 903. In some applications, components of physical assets that are in close proximity may be grouped together. In other applications, it can be advantageous to group geographically disperse assets.

Figure 10:
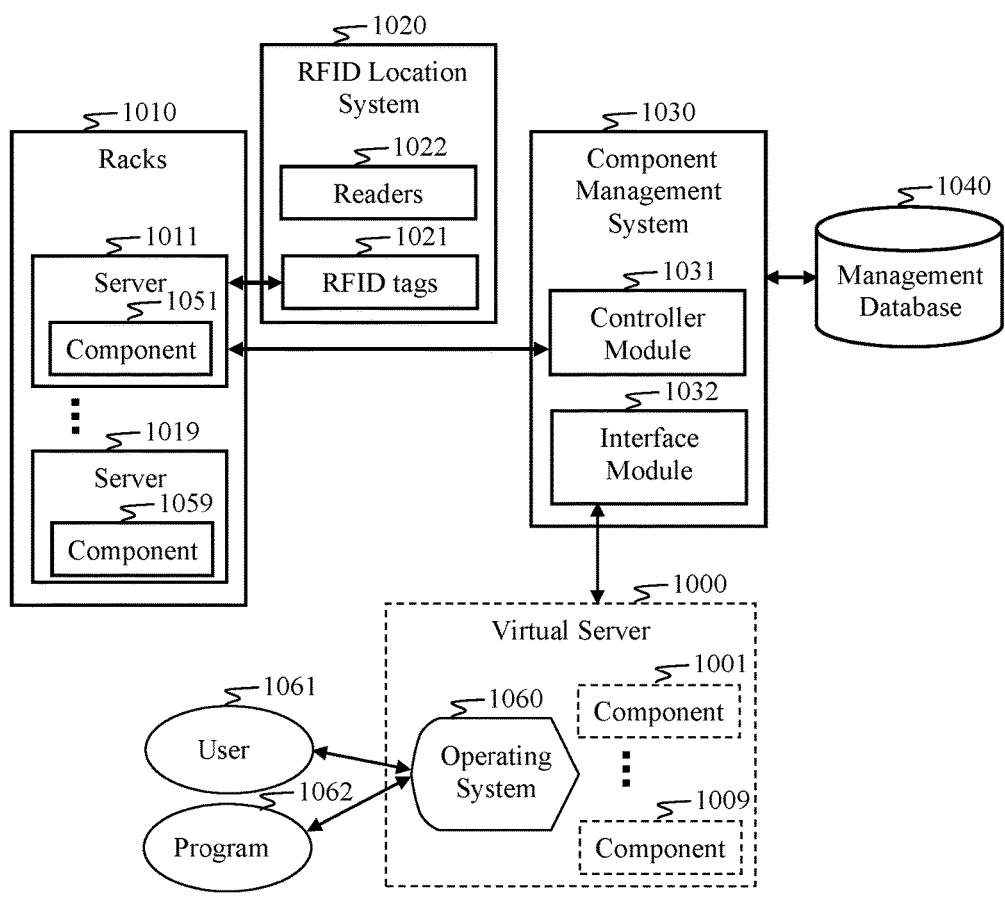
FIG. 10 is a block diagram of a system in accordance with some aspects of the inventive subject matter.

FIG. 10 is a block diagram of a system according to aspects of the inventive subject matter. In some aspects, the system is configured to manage multiple hardware components (such as computer server components 1051 and 1059) residing in rack-mounted equipment (such as servers 1011-1019) residing in multiple equipment racks 1010 located in one or more data centers. Examples of rack-mounted equipment 1011-1019 include computers, servers, switches, routers, power supplies, and storage appliances. In some aspects of the inventive subject matter, each component 1051-1059 may comprise one of a computer processing unit, a memory, a network interface, or a special purpose processor. Although the components 1051-1059 reside in multiple servers 1011-1019, more than one component 1051-1059 may reside in at least one of the servers 1011-1019. In aspects of the inventive subject matter, the components 1051-1059 are allocable hardware components for use in a distributed computing system. A set comprising a plurality of the components 1051-1059 comprises a sufficient number of different component types such that the set constitutes all of the components necessary to provide a complete computer system.

A distributed computer system in accordance with one aspect of the inventive subject matter comprises a plurality of the allocable hardware components 1051-1059 residing in a plurality of distributed machines 1011-1019. A communication network (not shown) communicatively couples together the plurality of hardware components 1051-1059. A controller (such as controller module 1031 configured as part of a component management system 1030) is configured to select a set of the allocable hardware components 1051-1059. The controller 1031 may first determine the availability of each of the allocable hardware components 1051-1059 as a prerequisite for selecting the set. For example, the controller 1031 may interface with an RFID location system 1020 comprising one or more RFID readers 1022 and RFID tags 1021 affixed to the rack-mounted equipment 1011-1019. A hardware abstraction layer may be implemented by an interface module 1032, which generates an interface that represents the set of the allocable hardware components 1051-1059 as a single machine.

In accordance with some aspects of the inventive subject matter, the component management system 1030 interfaces with a management database 1040. The management database 1040 may comprise a list of the allocable hardware components 1051-1059. At least one of the component management system 1030 and the management database 1040 may filter the list based on one or filter criteria such as may comprise predetermined filter criteria and/or dynamically determined filter criteria. The controller 1031 may employ one or more filter parameters, such as comprising a customer identifier, a component type, a machine type, a manufacturer identifier, a model number, and/or a serial number. In one aspect, filter criteria are entered by a user 1061 and/or a software program 1062, which may indicate processing power, memory, acceptable latency, server bandwidth, and/or other required resources or system properties prior to implementing the distributed machine. In another aspect, filter criteria are determined dynamically, such as while a software program is executing, or in response to changing network conditions, load balancing, and/or component availability. For example, memory and/or processing resources may be allocated and/or released with respect to changing operating demands of the software program.

In one aspect of the inventive subject matter, the controller 1031 may employ the RFID location system to verify that the allocable hardware components 1051-1059 indicated in the management database 1040 exist prior to assembling the distributed machine. Data from the RFID location system may be used to determine the availability of each of the allocable hardware components 1051-1059. For example, location data may indicate if equipment is out of service, in storage, in transit, or in a facility where services, such as power, are disrupted. In some aspects, location data may be employed to select allocable hardware components 1051-1059 that are within close proximity. In other aspects, location data may be employed to select allocable hardware components 1051-1059 that are geographically distributed. In some aspects of the inventive subject matter, location information may comprise network topology locations. Thus, relative network topology locations may be employed by the controller 1031 for selecting hardware components 1051-1059.

In accordance with some aspects of the inventive subject matter, the controller 1031 is configured to provide interoperability between components 1051-1059 in machines 1011-1019 that operate according to different protocols. For example, the controller 1031 may translate messages and/or data from component 1051 configured with respect to a first machine protocol corresponding to server 1011 to a second machine protocol corresponding to server 1019 before communicatively coupling the messages and/or data to component 1059. Such interoperability processes may be hidden from the user 1061 and/or software program 1062 via an abstraction produced by interface module 1032. The controller 1031 may employ various communication networks, including multiple networks employing more than one communication protocol. In some aspects of the inventive subject matter, while such inter-component communication is hidden from the user 1061 and/or software program 1062, certain effects of the communication, such as latency and/or bandwidth limitations between components 1051-1059 may be revealed to the user 1061 and/or software program 1062. Similarly, the effects of other functional aspects related to operations of the controller 1031 may be revealed.

In accordance with one aspect of the inventive subject matter, the interface module 1032 a virtual server 1000, which comprises an abstraction of the system comprising the distributed server components 1051-1059. For the purposes of user 1061 interface and/or program 1062 interface, the virtual server 1000 is a single machine comprising virtual hardware components 1001-1009 corresponding to the distributed components 1051-1059. An operating system 1060 on the virtual server 1000 may be implemented via the interface module 1031 to interface with the user 1061 and/or program 1062.

In some aspects of the inventive subject matter, the virtual server 1000 abstraction may remain static for different implementations of a distributed server. In accordance with some aspects, the representation of components 1001-1009 may not change for different distributed servers, but properties of the components (e.g., hard-drive space, RAM, processing power, etc.) may be adapted by the interface module 1032.

In accordance with some aspects of the inventive subject matter, the hardware abstraction layer provided by the interface module comprises multiple layers of abstraction based on at least one of user 1061 type and software program 1062 type. As described above, the hardware abstraction layer may reveal functional parameters related to implementations of the components 1051-1059 as a distributed computer.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification or claims refer to at least one of something selected from the group consisting of A, B, C . . . and N, the text should be interpreted as requiring only one element from the group, not A plus N, or B plus N, etc.

The invention claimed is:

1. An apparatus, comprising:
   a control function module configured to manage a set of network devices having a corresponding allocated rack space, the set being sparsely distributed over multiple cabinets, wherein an aggregate rack space occupied by the set does not exceed the allocated rack space;
   a user interface communicatively coupled to the control function module and configured to generate a virtual representation visible to a user of the set residing in a virtual cabinet corresponding to the allocated rack space; and
   a user control module to enable the user to interact with the set to configure a functionality of at least one network device in the set residing in the virtual cabinet.

2. The apparatus of claim 1, wherein the control function module is configured to receive sensor information for each network device in the set from an asset location system, the sensor information comprising at least one of geographical location information, network topology information, an indication that a particular rack-mounted instrument exists, and an indication that a particular rack-mounted instrument is available for use.

3. The apparatus of claim 2, wherein the asset location system comprises a radio frequency identification (RFID) system comprising at least one of a plurality of passive RFID tags and a plurality of active RFID tags.

4. The apparatus of claim 3, wherein the at least one of the plurality of passive RFID tags and the plurality of active RFID tags comprises at least one of a predetermined relationship with a plurality of rack-mounted instruments, the predetermined relationship comprising a one-to-one relationship, a many-to-one relationship, and a one-to-many relationship.

5. The apparatus of claim 2, wherein the asset location system comprises an asset filter configured to search devices according to at least one filter parameter and designate the set as devices that meet the at least one filter parameter.

6. The apparatus of claim 5, wherein the at least one filter parameter comprises at least one of a customer identifier, an instrument manufacturer, an instrument type, an instrument model number, an instrument operating status, a serial number, a geographical location, and a network topological location.

7. The apparatus of claim 1, wherein the functionality comprises operating the set of network devices individually and/or collectively.

8. The apparatus of claim 1, wherein the virtual cabinet includes a representation of a physical device and/or a virtual machine.

9. A method, comprising:
providing for control of a set of network devices having a corresponding allocated rack space, the set being sparsely distributed over multiple cabinets, wherein an aggregate rack space occupied by the set does not exceed the allocated rack space;
generating a virtual representation visible to a user, the virtual representation depicting the set residing in at least one virtual cabinet corresponding to the allocated rack space; and
providing a user control module to enable the user to interact with the set to configure a functionality of at least one network device in the set residing in the virtual cabinet.

10. The method of claim 9, further comprising receiving sensor information for each network device in the set from an asset location system, the sensor information comprising at least one of geographical location information, network topology information, an indication that a particular rack-mounted instrument exists, and an indication that a particular rack-mounted instrument is available for use.

11. The method of claim 10, wherein the asset location system comprises a radio frequency identification (RFID) system comprising at least one of a plurality of passive RFID tags and a plurality of active RFID tags.

12. The method of claim 11, wherein the at least one of the plurality of passive RFID tags and the plurality of active RFID tags comprises at least one of a predetermined relationship with a plurality of rack-mounted instruments, the predetermined relationship comprising a one-to-one relationship, a many-to-one relationship, and a one-to-many relationship.

13. The method of claim 9, further comprising searching devices according to at least one filter parameter and selecting devices for the set that meet the at least one filter parameter.

14. The method of claim 13, wherein the at least one filter parameter comprises at least one of a customer identifier, an instrument manufacturer, an instrument type, an instrument model number, an instrument operating status, a serial number, a geographical location, and a network topological location.

15. An apparatus, comprising:
a plurality of allocable hardware components residing in a plurality of distributed network machines;
a communication network communicatively coupling together the plurality of hardware components;
a controller configured to determine availability of each of the allocable hardware components and select a set of the allocable hardware components upon determining the availability; and
a hardware abstraction layer comprising a user interface that represents the set as a single network machine to a user, and comprising a user control module for enabling the user to operate the network machine.

16. The apparatus of claim 15, wherein each of the plurality of allocable hardware components comprises at least one of a computer processing unit, a memory, a network interface, and a special purpose processor.

17. The apparatus of claim 15, wherein the controller is configured to provide interoperability between a plurality of components in the set operating according to different protocols.

18. The apparatus of claim 15, wherein the controller is configured to select the set based on at least one filter parameter, the at least one filter parameter comprising a customer identifier, a component type, a machine type, a manufacturer identifier, a model number, a serial number, latency, bandwidth, congestion, and load balancing associated with the communication network.

19. The apparatus of claim 15, wherein the controller is configured to adapt selection of the set based on at least one of inputs provided by the user, processing capabilities required by a software program to run on the apparatus, memory required by the software program running on the apparatus, and network interface criteria determined by a server program running on the apparatus.

20. The apparatus of claim 15, wherein the user interface comprises a common interface for a plurality of different sets of the allocable hardware components.

21. The apparatus of claim 15, wherein the hardware abstraction layer provides a plurality of layers of abstraction based on at least one of user type and at least one software program type.

22. The apparatus of claim 15, the user interface comprises a filter input whereby a user can input at least one filter type to the controller.

23. A method, comprising:
determining availability of each of a plurality of distributed network machines, each network machine comprising at least one of a plurality of allocable hardware components;
from the availability, determining a plurality of selected distributed network machines, the plurality of selected distributed network machines comprising a sufficient plurality of allocable hardware components to function as a single computer server;
communicatively coupling together the sufficient plurality of allocable hardware components; and
generating a hardware abstraction layer comprising a user interface that represents the sufficient plurality of allocable hardware components as a single device and includes a control module to operate the single device.

24. The method of claim 23, wherein each of the plurality of allocable hardware components comprises at least one of a computer processing unit, a memory, a network interface, and a special purpose processor.

25. The method of claim 23, wherein providing for communicatively coupling comprises providing for interoperability between the sufficient plurality of allocable hardware components that operate according to different protocols.

26. The method of claim 23, wherein determining the plurality of selected distributed network machines comprises filtering the plurality of available distributed network machines, wherein filtering comprises employing at least one filter parameter, comprising a customer identifier, a component type, a machine type, a manufacturer identifier, a model number, a serial number, latency, bandwidth, congestion, and load balancing.

27. The method of claim 23, wherein determining the plurality of selected distributed network machines is adapted based on at least one of a user input, processing capabilities required by a software program on the single device, memory required by the software program, and network interface criteria determined by the software program.

28. The method of claim 23, wherein the hardware abstraction layer provides a plurality of layers of abstraction based on at least one of user type and at least one software program type.

* * * * *